United States Patent
Shah

(10) Patent No.: US 11,765,228 B2
(45) Date of Patent: Sep. 19, 2023

(54) BLOCKCHAIN VIRTUAL MACHINE SYSTEMS AND METHODS

(71) Applicant: Ciena Corporation, Hanover, MD (US)

(72) Inventor: Shvetal Shah, Marietta, GA (US)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/176,394

(22) Filed: Feb. 16, 2021

(65) Prior Publication Data

US 2022/0263896 A1 Aug. 18, 2022

(51) Int. Cl.
*H04L 67/1087* (2022.01)
*H04L 69/321* (2022.01)
*G06F 9/455* (2018.01)
*H04L 69/08* (2022.01)

(52) U.S. Cl.
CPC ...... *H04L 67/1091* (2013.01); *G06F 9/45558* (2013.01); *H04L 69/08* (2013.01); *H04L 69/321* (2013.01); *G06F 2009/45595* (2013.01)

(58) Field of Classification Search
CPC ... H04L 67/1091; H04L 69/08; H04L 69/321; G06F 9/45558; G06F 2009/45595
USPC ........................................................ 709/201
See application file for complete search history.

(56) References Cited

U.S. PATENT DOCUMENTS

| 7,120,792 | B1 | 10/2006 | Jacobson et al. | |
| 11,308,487 | B1* | 4/2022 | Foster | G06Q 20/3829 |
| 2019/0244181 | A1* | 8/2019 | Edelman | G06Q 20/382 |
| 2019/0287200 | A1* | 9/2019 | Schuler | H04L 9/3239 |
| 2019/0385167 | A1 | 12/2019 | Subhedar et al. | |
| 2020/0068573 | A1* | 2/2020 | Drozd | H04W 12/08 |
| 2020/0287788 | A1 | 9/2020 | Triplet et al. | |
| 2021/0112146 | A1* | 4/2021 | Sevindik | H04L 67/322 |
| 2021/0174356 | A1* | 6/2021 | Buradagunta | G06Q 20/388 |
| 2021/0303713 | A1* | 9/2021 | Sreedhar | G06F 21/6218 |
| 2021/0304191 | A1* | 9/2021 | O'Grady | G06Q 20/36 |
| 2021/0357893 | A1* | 11/2021 | Kang | G06Q 20/1235 |
| 2022/0166626 | A1* | 5/2022 | Madisetti | H04L 67/10 |
| 2023/0224161 | A1* | 7/2023 | Shang | H04L 9/50 713/150 |

FOREIGN PATENT DOCUMENTS

| WO | WO-2020133148 A1 * | 7/2020 | ......... G06F 16/2379 |
| WO | WO-2021102572 A1 * | 6/2021 | ......... G06F 16/214 |
| WO | WO-2021204381 A1 * | 10/2021 | |

OTHER PUBLICATIONS

Nweke, Layer 1 vs layer 2 vs layer 3 Blockchain scaling solution, Nov. 29, 2022, https://www.linkedin.com/pulse/layer-1-vs-2-3-blockchain-scaling-solution-innocent-c-nweke#:~: text=In%20summary%2C%20Layer%201%20is,hosts%20decentralized%20applications%20(DApps). (Year: 2022).*

* cited by examiner

*Primary Examiner* — James E Springer
(74) *Attorney, Agent, or Firm* — Baratta Law PLLC; Lawrence A. Baratta, Jr.

(57) ABSTRACT

Systems and methods implemented by a network element include executing a virtual machine that processes and manages a first Blockchain; communicating with a plurality of nodes in the network, each being part of a peer-to-peer network that manages the first Blockchain, wherein at least one node of the plurality of nodes one of i) operates at a different network layer and ii) utilizes a different protocol for communication, from the network element; and performing one or more applications utilizing the first Blockchain.

11 Claims, 11 Drawing Sheets

```
assethash: '0x45eb9c96895b00f52a99c4ed68c2f07e9af8cc38822244c867a3feb969a3a7df',
assetjson: '{"owner":"att","tid":"NYC456","aid":"1-A-2","bw":"100gbe","duration":"6mo"}',
assetprice: '20000000000000000000',
assetowner: '0x728de03c84E3f9270FBa7e1dfd1227765690071b',
buyer: '0x0000000000000000000000000000000000000000',
seller: '0x728de03c84E3f9270FBa7e1dfd1227765690071b',
buyerok: false,
sellerok: false,
buyerask: false,
escrowaccount: '0x0000000000000000000000000000000000000000' }
```

FIG. 3

```
//digital asset work flow commands
//parameter 1 is the index of the account sending the transaction
//parameter 2 is the passphrase to unlock the account
//parameter 3 is the asset index number { let r = buyrequest(2,'shvetal',1) }
{ let r = sellerapprovebuyerrequest(1,'shvetal',1) }
{ let r = sellerrejectbuyerrequest(1,'shvetal',1) }
{ let r = buyerapprovereceiveasset(2,'shvetal',1) }
{ let r = buyerrejectsellerapproval(2,'shvetal',1) }
{ let r = sellercompletesassettransfer(1,'shvetal',1) }
```

FIG. 4

```
> buyrequest from 0x86E10c6d3fbcf4286844200FB1722062f5cC2ea9
{object Object}

> { let r = sellerapprovebuyerrequest(1,'shvetal',1) }
undefined
> seller approves buyrequest from 0x728de03c84E3f9270FBa7e1dfd1227765690071b
{object Object}

> sbal()

####################
SUN TOKEN Balances
####################
'complete'
>
0x619463CF12bd634F3f9C35abaAc04a30fd2a5f34
993020
--

0x728de03c84E3f9270FBa7e1dfd1227765690071b
3000
--

0x86E10c6d3fbcf4286844200FB1722062f5cC2ea9
3980
--

> { let r = buyerapprovereceiveasset(2,'shvetal',1) }
undefined
>
> buyer  0x86E10c6d3fbcf4286844200FB1722062f5cC2ea9 approves seller approval
{object Object}

> { let r = sellercompletesassettransfer(1,'shvetal',1) }
undefined
> seller completes asset transfer 0x728de03c84E3f9270FBa7e1dfd1227765690071b
{object Object}

> sbal()

####################
SUN TOKEN Balances
####################
'complete'
>
0x619463CF12bd634F3f9C35abaAc04a30fd2a5f34
993000
--

0x728de03c84E3f9270FBa7e1dfd1227765690071b
3020
--

0x86E10c6d3fbcf4286844200FB1722062f5cC2ea9
3980
--
>
```

*FIG. 5*

```
####################################
processing log
Result {
   '0': 'submit supply chain finance accounting asset',
   __length__: 1,
   _generic: 'submit supply chain finance accounting asset' }
####################################
processing log
Result {
   '0': 'submit supply chain finance accounting asset',
   __length__: 1,
   _generic: 'submit supply chain finance accounting asset' }
####################################
processing log
Result {
   '0': 'submit supply chain finance accounting asset',
   __length__: 1,
   _generic: 'submit supply chain finance accounting asset' }
####################################
processing log
Result {
   '0': 'buyer_request_buy_asset',
   __length__: 1,
   _generic: 'buyer_request_buy_asset' }
####################################
processing log
Result {
   '0': 'seller_approve_buy_asset_request',
   __length__: 1,
   _generic: 'seller_approve_buy_asset_request' }
####################################
processing log
Result {
   '0': 'buyer_approve_receive_asset',
   __length__: 1,
   _generic: 'buyer_approve_receive_asset' }
####################################
processing log
Result {
   '0': 'seller_completes_asset_transfer',
   __length__: 1,
   _generic: 'seller_completes_asset_transfer' }
undefined
```

FIG. 6

BLOCKCHAIN VIRTUAL MACHINE SYSTEMS AND METHODS

FIELD OF THE DISCLOSURE

The present disclosure generally relates to networking. More particularly, the present disclosure relates to Blockchain Virtual Machine systems and methods.

BACKGROUND OF THE DISCLOSURE

The term Blockchain describes a collection of technologies that have been popularized by cryptocurrency applications. The technology includes cryptography, peer-to-peer networks, consensus algorithms, and a programming language to specify contracts that govern what gets written to a decentralized and distributed ledger. Each component technology offers a unique capability that can be applied to solve different problems. Ethereum is an open-source Blockchain platform and is widely used for custom private, permissioned, federated, and enterprise applications. It is possible to modify Ethereum's consensus algorithm with one that increases the number of transactions per second the system can process by streamlining the mining process and making distinctions between validators and user nodes that specifically target their needs and of the enterprise in general. Proof of work can also be applied to enterprise applications with validators and user node design models. The compute requirements of proof of work are acceptable when assigned to the validators only and where the default transaction speed is ok.

Some common uses for Blockchains range from records and verifications writing to a distributed ledger, payments and money transfer and orders, platforms and marketplace infrastructure, supply chain management, and smart contracting. The simplest application is for records and verifications writing to a distributed ledger. The distributed ledger technology that is part of Blockchain provides real-time information sharing by default. This secure sharing increases data integrity, the ability to track and trace real-time information, and forms the foundation for analytics applications. Records and verifications capabilities can be used to capture the steps of products and services lifecycles being exchanged from producer to consumer. For example, lifecycle events of a bilaterally traded derivatives contract in a decentralized over-the-counter marketplace. In these scenarios, payments and netting, accounting, tracking, and trading ownership can be included and are fundamental capabilities of Blockchains.

In general, a market is a place where parties engage in exchange. Good and services are exchanged using money or barter. The market facilitates trade and enables the distribution and allocation of resources. In economic terms, the market is a system that allows buyers and sellers to exchange any type of good, services, information, and digital asset. The supply chain is a kind of market structure that is a complex and dynamic supply and demand network where producers and consumers perform exchanges to convert raw materials to finished goods and services. These concepts and structures are investigated, and blockchain capabilities are applied to the key functions of these systems.

On a Blockchain, there can be a large number of buyers and sellers. The real-time sharing of information on the distributed ledger allows information about prices and products to be shared almost perfectly. This helps solve imperfect information issues in supply chain applications. The barriers to entry and exit are lower. The software is open-source, and access can be provided on a pay-per-use or subscription basis. Smart contracts can provide well-defined rights and what may be sold and transferred to buyers.

Conventional systems include open-source Blockchain decentralized applications for finance. Technology vendors provide network elements, management, and operational support systems. Financial intermediaries process payment and securities contracts. Operational, business, network, and finance are distinct systems, and existing decentralized finance solutions are not integrated with network operations. That is, in the context of networking, network elements do not have embedded blockchain capabilities. The present disclosure looks at possible integration and applications.

BRIEF SUMMARY OF THE DISCLOSURE

In various embodiments, the present disclosure includes a method with steps, a network element that is configured to implement the steps, and a non-transitory computer-readable medium having instructions stored thereon for programming one or more processors associated with a network element in a network to perform the steps. The steps include executing a virtual machine that processes and manages a first Blockchain; communicating with a plurality of nodes in the network, each being part of a peer-to-peer network that manages the first Blockchain, wherein at least one node of the plurality of nodes one of i) operates at a different network layer and ii) utilizes a different protocol for communication, from the network element; and performing one or more applications utilizing the first Blockchain. The at least one node can utilize the one of the different network layer and the different protocol for implementing a consensus algorithm. The steps can further include receiving a transaction associated with a second Blockchain; and processing the transaction with a first consensus algorithm associated with the first Blockchain. The second Blockchain can utilize a second consensus algorithm that is different from the first consensus algorithm. The second Blockchain can be from a second peer-to-peer network that is at the different network layer from the peer-to-peer network. The steps can further include utilizing JavaScript Object Notation (JSON) to record data in the first Blockchain. The communicating can include encryption. The one or more applications can include network capacity tokenization.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is an output from a Blockchain that shows the structure of an asset.

FIG. 4 is an Application Programming Interface (API) for processing the state transitions of the asset/title bi-lateral transfer process of FIG. 2.

FIG. 5 is an example of transactions using the API of FIG. 4.

FIG. 6 is event logs from the transactions of FIG. 5.

DETAILED DESCRIPTION OF THE DISCLOSURE

Figure 1:
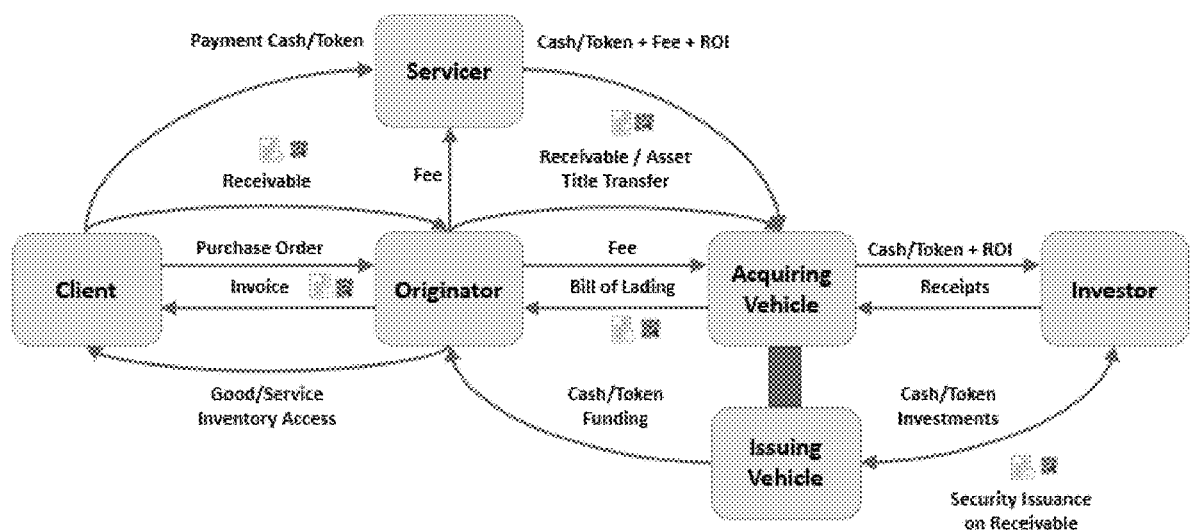
FIG. 1 is a flow diagram of a securitization process.

The present disclosure relates to Blockchain Virtual Machine (VM) systems and methods. In particular, the Blockchain VM is integrated into network elements in a network for supporting a Blockchain network that can be used in network operations, financial business processes, etc., in a decentralized and automated manner across domains. Various applications include network capacity tokenization and cryptocurrency for network service contracts, a decentralized marketplace for trading network service contracts, a Raft consensus algorithm for network routing and signaling distributed state machine, an Istanbul consensus algorithm for token verification and finality, a JSON based schema for extensions to state machine and logging, network asset demand and pricing model based on a page rank algorithm, a zero-knowledge proof for secure multi-party encryption, a custom routing and signaling protocol that operate across domains, an integrated multi-signature workflow across organization boundary and domain, and the like.

This approach, for network management, that is decentralized and peer-to-peer technology brings a new level of reliability and fault tolerance to typical network management tasks but, more importantly, also integrates business functions across international boundaries, reduces the cost of transactions, and opens up opportunities for trade finance, and derivatives transactions based on the digitization of network assets. The present disclosure includes a network digital asset securitization process to coordinate between a decentralized peer-to-peer network of carriers and data centers, improving the automating and adaptation of networks.

Some benefits of the approach described herein are a lower barrier of entry, tax avoidance, regulatory and sanction avoidance, anonymity, enables product innovation, reduce setup costs, reduce lead times, reduce reconciliation error, reduced total transaction costs, reduced manual reconciliation, increased transparency, managed regulatory oversight, process optimization, complex lifecycle management, supply and demand signaling, real-time information sharing, increasing efficiency, middle office cost reductions, fee-earning opportunities, and the like.

Blockchain Architecture

Use cases for Blockchain and their decentralized consensus algorithms include a scenario where no trusted centralized third party is present. The trusted third party is an intermediary such as a financial institution, certificate authority. etc. In the case where a trusted third party is suspect, then a decentralized trusted third party could be established and governed by a consortium of like-minded peers. This is the idea of disintermediation of the intermediary. Using Blockchain, the peers create an ad hoc multidisciplinary organization and govern themselves through smart contracts. Recent architectural design shows a configuration of validators and user nodes to provide trust, real-time sharing, and rules for writing to the shared ledger.

The proof of work algorithm is a consensus mechanism that can be used to deter denial of service attacks. It requires a CPU (Central Processing Unit) cost function to be performed and solved. Byzantine faults are conditions in distributed computers where components may fail and there is imperfect information on whether a component has failed. This can be done either on purpose or in error. This is where different symptoms are presented to different observers. In the case of cryptocurrency, the number tokens one has and how many to transfer can be the messages that are sent and received. Byzantine fault tolerance (BFT) solutions are often put into low latency, high availability systems.

Financial Messaging Infrastructure

Swift is The Society of Worldwide Interbank Financial Telecommunication is a network that enables financial institutions worldwide to send and receive information about financial transactions in a secure, standardized, and reliable environment. It is used to process cross-border payment orders. Swift does not facilitate funds transfer. The payment orders are received by each bank in the transaction, and the bank settles the transaction in their corresponding accounts. In response to the disruption, Blockchain can provide these functions. Swift has responded with GPI or Global Payments Innovation. Swift consists of a secure network, financial message syntax, connection software and services. Each of these capabilities can be provided by the private Ethereum blockchain. The secure network and connection software come standard with the open-source tools. The financial message syntax can be programmed with Smart Contracts and Application Programming Interface (API) technology. In general, Swift is a private network that is governed by a cooperative of financial institutions. This is similar to a consortium operating a private or permissioned Blockchain. Swift transaction infrastructure services provided are authentication and identification, validation, verification, authorization, processing and recording, communication. All of these capabilities can be provided by Ethereum.

The Cross Border Interbank Payment System (CIPS) is a Financial Telecommunications product. It offers clearing and settlement services for its participants. Like Swift, CIPS would not facilitate funds transfer, but it sends payment orders, which must be settled by correspondent accounts that the institutions have with each other. A correspondent account is an account established by a banking institution to receive deposits from, make payments on behalf of. These Nostro Vostro accounts are established through bilateral agreements between the two banks.

Digital Asset Securitization

Securitization is the pooling of assets and selling their related cash flows to third party investors as securities. In this case, digital assets can be considered asset-backed securities. Key structural elements of securitization are the ability to pool and transfer assets and their related cash flows. Asset-backed securities whose value is derived from a collateralized pool of underlying assets are generally small and illiquid individually. Derivatives are contracts that derive their value from the underlying asset. In this case, derivative contracts can be created on the underlying digital assets that have been tokenized. Tokenization of assets offers the opportunity for almost any asset that has the opportunity to create a cash flow. A special purpose vehicle is a legal entity created to handle securitization, risk sharing, regulation, asset transfer, tax avoidance, and to remove assets that are being securitized from the balance sheets of the parent company, creating bankruptcy remoteness.

Some key opportunities for the application of Blockchain platform are marketplaces and exchanges, issuance of tokenized assets, custody services, digital asset-based funds, securities and derivatives, tokenized fiat currency, and the like. The issuance of tokenized assets offers a low-cost technique to access a capital market for small to medium-sized enterprises. In this process, any asset that produces a stream of payments can be tokenized and securitized. Derivatives can be applied to these securities for further opportunity and risk management. This issuance business allows the tokenization of shares in non-public companies, small and large. The solutions also offer an infrastructure for trading and a virtual private marketplace using Blockchain. On this platform, the digital tokenized assets can be traded, and their chain of custody be determined and managed. To facilitate the conversion of digital assets to cash, tokenized fiat currencies pools.

Digital Index=Securitize(Digital Asset 1 . . . N)

Derivative(Digital Index)

Key business capabilities that are targeted and where Blockchain is expected to provide solutions for capital markets, trading and clearing, market making, middle office automation, interchain transactions, bilateral and multilateral exchanges, off-chain records, liquidity and asset pools, fractional ownerships, capital call process, investments and distributions, real-time auditing, legal clauses and business logic, netting payments and multi-party agreements, managing novation process, structured finance design and special purpose vehicle structure, master contract management, derivatives lifecycle, private equity lifecycle, managing rights and licenses, managing governance, coordination, and regulatory compliance.

Not all offerings of securities must be registered with the Securities and Exchange Commission (SEC). Some exemptions from the registration requirement include private offerings to a limited number of persons or institutions, offerings of limited size; intrastate offerings; and securities of municipal, state, and federal governments. By exempting many small offerings from the registration process, the SEC seeks to foster capital formation by lowering the cost of offering securities to the public. Most provisions of the Exchange Act apply only to "registered securities," which include all securities that are publicly traded on a stock exchange or elsewhere. This excludes securities of private companies (e.g., companies whose securities are not marketed to the public) and, in particular, not traded on a stock exchange. Under the Howey Test, a transaction is an investment contract if it is an investment of money; this includes investments of assets. There is an expectation of profits from the investment. The investment of money is in a common enterprise and any profit comes from the efforts of a promoter or third party.

In Luxembourg and the Cayman Islands, for example, there are laws in place that enable efficient tax management and bankruptcy remoteness through the use of special-purpose vehicles. It could be designed where a company creates a tokenization scheme in these tax and regulatory havens to coordinate the execution of foreign investment funds and derivatives contracts on digital asset-backed securities. Additionally, the SEC exemption may help enable privately coordinated securitization that does not market publicly. This can help support the concept of private market infrastructure. According to PWC, in capital markets, increased funding is coming from private markets, and they will complement and compete with public markets in the future.

Supply Chain Finance

Receivables are typically the largest single asset on a company's balance sheet. They are a good choice for monetization through a securitization process, such as illustrated in FIG. 1. FIG. 1 shows a combination of events and actors that are part of the process for the securitization of trade receivables. Investors can choose different structured finance options that are calibrated to the business and risk requirements. In this case, the receivables are pooled, securitized, and issued to investors. Additionally, an index can be computed for the securities, and derivative contracts are developed. The securitization process is an enhancement to the existing industry practice by integrating supply chain and financial operations through the use of decentralized risk and funding pools consisting of acquiring, issuing vehicles and investors.

Solution Design and Benefits

Virtualization of financial architecture can be applied to regulatory, central and investment banking, securitization, derivative product capabilities. These features and functions can be implemented into any applications to a variety of sectors and industries that require financial services.

A distributed ledger is a kind of database where information can be recorded. The proposed solution here extends this capability by integrating JavaScript Object Notation (JSON) data structures that are stored in the Blockchain log and transaction events. These events can be handled in real-time and or read from the ledger records written in the topics section of the relevant transactions. This creates the foundation for an analytics platform where trades and exchanges can be tracked and traced for custody.

The digital asset solution smart contract design consists of a combination of ERC-20 and ERC-721 Ethereum concepts with a workflow implementation that allows multiple transactions and signatures needed to transfer a tokenized asset between parties using a decentralized central counterparty idea.

Figure 2:
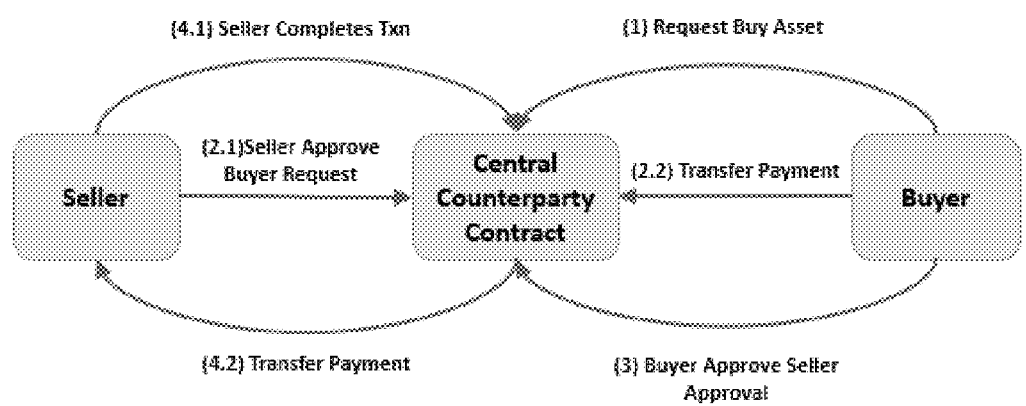
FIG. 2 is a flow diagram of an asset/title bi-lateral transfer process.

For example, if a party is selling an asset to a buyer, the following can occur, as illustrated in FIG. 2.

1) The buyer request purchase of the asset from the seller.

2) The seller would approve the buyer request-token transfer to the counterparty.

3) The buyer would approve the seller's approvals.

4) The seller would complete transaction-token transfer from a counterparty to the seller.

During these steps, an address is associated with the buyer, seller, and central counterparty. There is a structure in the contract that represents different states of buyer ask, seller ok, buyer ok to model the workflow and state machine. Each transaction uses a signature to change the states of these variables. The structure contains a JSON data extension to model the characteristics of the digital asset and act as a key for external referential integrity into other databases and off-chain systems.

In general, applications require a variety of workflows and finite state machines to implement unique business processes. One option is to model these states as Boolean variables in the smart contract data structures. Each sending of transactions requires a signature and can change the status of the Boolean variable in the structure to represent a state transition. When considering more complex flows, then model a graph data structure in the smart contract to better handle the business process and finite state machine.

Some design patterns for managing account addresses are the multiple instances of the same contract, each having its own address and multiple user account addresses using a single instance of a contract. Depending on the application, one may want to instantiate a new contract for each end-user or have many end-users use a single contract. The business domains, boundaries and functional use cases would inform how to uses the address schemes.

In an embodiment, the FIG. 3 is an output from the Blockchain that shows the structure of an asset. In this case, it is a network asset being digitized. The asset JSON will match the asset characteristics that is being digitized. This is the initial state of the asset being transferred to another party. There is an asset owner, seller, and buyer addresses that are associated with this structure. The asset_hash is a SHA256 of the asset_json. The escrow account is the central counterparty and the security_token contract owner. It has the three state variables buyer ok, seller ok, and the buyer asks to manage state transitions.

FIG. 4 is an API for processing the state transitions of the Asset/Title Bi-lateral Transfer Workflow. FIG. 5 is an example of transactions using the API of FIG. 4. During these transactions, the 20 SUN Tokens were transferred to the escrow account owner ending in 34. Note here that the asset owner's address now is different than originally. The 20 SUN Tokens now belong to the original owner address ending in 1b. The new owner is the address ending in a9. As the states transition. the state variables will be changed from false to true. The output is from reading past event logs from the topic sections of the relevant transactions tied to the security_token contract. One can produce a track and trace log from reading the event logs from the Blockchain. The first three records show the assets being submitted into the system. FIG. 6 is event logs showing the transactions happening when different state transitions are called. From this sample, one can see how to elaborate on the content of the event details and create a foundation for an analytics platform.

Some benefits of applying Blockchains are a lower barrier of entries, tax avoidance, regulatory and sanction avoidance, anonymity, enables product innovation, reduce setup costs, reduce lead times, reduce reconciliation error, reduce total transaction costs, reduce manual reconciliation, increase transparency, manage regulatory oversight, process optimization, complex lifecycle management, supply and demand signaling, real-time information sharing, increasing efficiency, middle office cost reductions, fee earning opportunities.

Blockchain Virtual Machine

Figure 7:
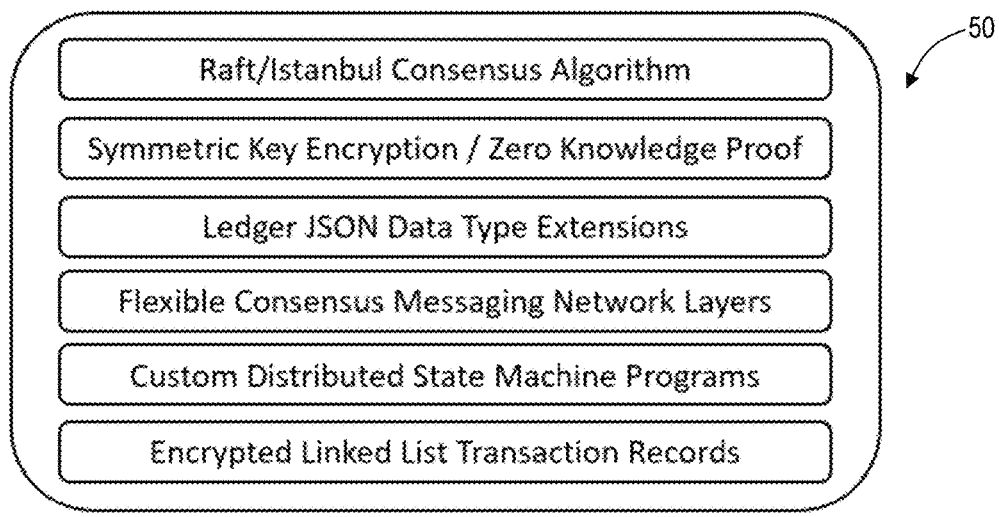
FIG. 7 is a block diagram of a blockchain virtual machine and associated functionality.

FIG. 7 is a block diagram of a blockchain virtual machine 50 and associated functionality. As is known in the art, the virtual machine 50 is a virtualization of a computer system that provides the equivalent functionality of a physical computer. The virtual machine 50 is executed on underlying computing hardware, which can implement multiple virtual machines 50. The functionality associated with the virtual machine 50 can be implemented as instructions stored on a non-transitory computer-readable medium for programming a computer, server, appliance, device, one or more processors, circuit, etc., to perform functions as described and claimed herein.

The functionality in the blockchain virtual machine 50 includes a Raft/Istanbul consensus algorithm, symmetric key encryption/zero-knowledge proof, ledger JSON data type extensions, flexible consensus messaging layers, custom distributed state machine programs, and encrypted linked list transaction records.

The blockchain virtual machine 50 can be referred to as a network finance blockchain virtual machine to provide blockchain automation, control, and monitoring capabilities to network elements, network management, financial, and legal business support systems integrating programmable network routing and signaling, financial settlement, and trade of network service contracts across domains using fungible cryptocurrency and non-fungible network capacity tokens. The blockchain virtual machine 50 automates decentralized business processes, governance, and workflows across organizational boundary and domain. The blockchain virtual machine 50 includes business processes for custom bilateral, multilateral automated smart contracts for network financial securities trading. The blockchain virtual machine 50 can implement a process for decentralized risk management and asset demand and pricing model.

Figure 8:
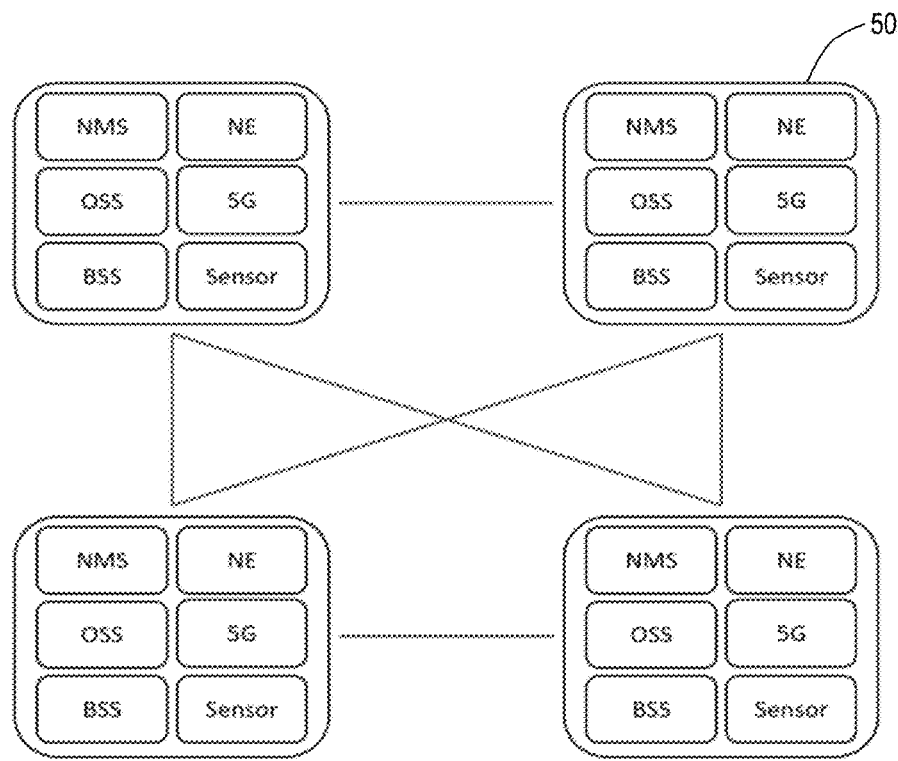
FIG. 8 is a block diagram of four blockchain virtual machines connected to one another.

FIG. 8 is block diagram of four blockchain virtual machines 50 connected to one another. In FIG. 8, the blockchain virtual machines 50 include Application Programming Interfaces (APIs) for a Network Management System (NMS), Network Element (NE), Operations Support System (OSS), 5G wireless systems, Business Support Systems (BSS), and sensors. FIG. 8 is a distributed peer-to-peer network with each blockchain virtual machine 50 being implemented at/executed on a network element in a network. The network elements can be switches, routers, packet-optical switches, cross-connects, Wavelength Division Multiplexing (WDM) terminals, Add/Drop Multiplexers (ADMs), and the like.

Also, the virtual machine 50 can be integrated with any one of the systems (e.g., NMS, OSS, BSS, NE, etc.). In an embodiment, there can be multiple carriers in a network and each carrier has its own NMS sensor. The virtual machine can be used to integrate backend systems between carriers.

Example Network

Figure 9:
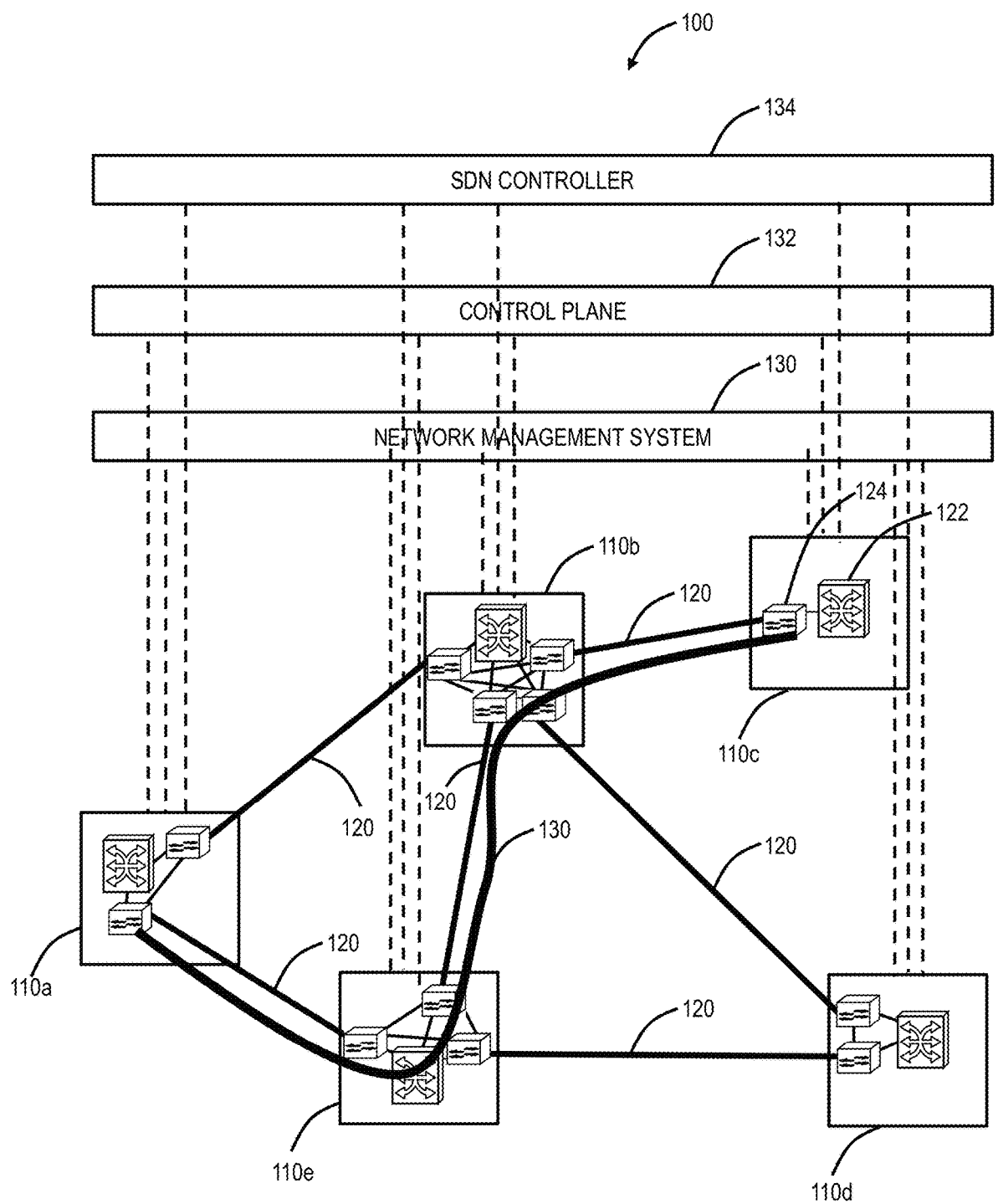
FIG. 9 is a network diagram of an example network with five interconnected sites.

FIG. 9 is a network diagram of an example network 100 with five interconnected sites 110a, 110b, 110c, 110d, 110e. The sites 110 are interconnected through a plurality of links 120. Each of the sites 110 can include a switch 122 and one or more WDM network elements 124, as well as other network elements and devices omitted for simplicity. The switch 122 is configured to provide services at Layers 1 (e.g., OTN/SONET/SDH/Wireless), Layer 2 (e.g., Ethernet), Layer 3 (e.g., Internet Protocol (IP), and the like (i.e., higher layers) as well as combinations thereof. The WDM network elements 124 provide the photonic layer (e.g., Layer 0) and various functionality associated therewith (e.g., multiplexing, amplification, optical routing, wavelength conversion/regeneration, local add/drop, etc.). Of note, while shown separately, those of ordinary skill in the switch 122 and the WDM network elements 124 may be realized in the same network element. The photonic layer can also include intermediate amplifiers and/or regenerators on the links 120, which are omitted for illustration purposes. The network 100 is illustrated, for example, as an interconnected mesh network, and those of ordinary skill in the art will recognize the network 100 can include other architectures, with additional sites 110 or with fewer sites, with additional network elements and hardware, etc. The network 100 is presented herein as an embodiment for of a multi-layer network with the network elements (e.g., the switch 122 and the network elements 124) having the blockchain virtual machine 50 implemented therewith.

The sites 110 communicate with one another optically over the links 120. The sites 110 can be network elements which include a plurality of ingress and egress ports forming the links 120. The network 100 is illustrated with a connection 130 between the sites 110a, 110c and through the sites 110b, 110e. The connection 130 can be a Subnetwork Connection (SNC), Label Switched Path (LSP), or any other end-to-end connection. Further, the connection 130 can include various different aspects such as a wavelength, Time Division Multiplexing (TDM) traffic, packet traffic, wireless channel, and a combination thereof.

The preceding descriptions focus on L0/L1 aspects of the network 100. Additionally, the network 100 can include other components forming L2, L3, and higher layer connections in the network 100, such as routers, switches, packet-optical transport systems, and the like. That is, the network 100 can include Ethernet, Virtual Local Area Network (VLAN), Multilayer Protocol Switching (MPLS), Internet Protocol, etc. connections as well. In an embodiment, the constrained path computation systems and methods can operate at a single Layer (L0, L1, L2, L3, etc.), and in another embodiment, the constrained path computation systems and methods can operate at multiple layers.

The network 100 can include a Network Management System (NMS) 130 that can provide an interface for Operations, Administration, Maintenance, and Provisioning (OAM&P) functions. Also, the network 100 can include a control plane 132 operating on and/or between the switches 122 at the sites 110a, 110b, 110c, 110d, 110e. The control plane 132 includes software, processes, algorithms, etc. that control configurable features of the network 100, such as automating the discovery of the switches 122, the capacity of the links 120, port availability on the switches 122, connectivity between ports; dissemination of topology and bandwidth information between the switches 122; calculation and creation of paths for connections; network-level protection and restoration; and the like. In an embodiment, the control plane 132 can utilize Automatically Switched Optical Network (ASON), Generalized Multiprotocol Label Switching (GMPLS), or the like. Those of ordinary skill in the art will recognize the network 100, and the control plane 132 can utilize any type of control plane for controlling the switches 122 and establishing connections therebetween. The network 100 can also include a Software-Defined Networking (SDN) controller 134. In an embodiment, the SDN controller 134, the control plane 132, and the NMS 130 can work together. In another embodiment, the SDN controller 134 can operate independently with or without the control plane 132. In a further embodiment, the SDN controller 134 may be omitted Specifically, the present disclosure provides blockchain virtual machines 50 that are executed on the network elements. Those skilled in the art will recognize these can be implemented utilizing processing components at the network elements as well as work with any of the network management system 130, the control plane 132, the SDN controller 134, as well as in-skin (locally on a network element). That is, the blockchain virtual machines 50 contemplate use of a Blockchain in any type of application, including networking, financial, etc.

As described herein, a network element can include the switches 122, the WDM network elements 124, but can also include User Equipment (UE) that is operating on the network 100. UEs can include mobile devices, laptop computers, servers, tablets, and the like.

Network elements with high-speed optical interfaces are fiber connections between the network 100 and financial organizations. The network elements execute the embedded network finance virtual machine 50. The network element encrypts the messages the consensus algorithm shares with other nodes.

Network Service Contracts

In an embodiment, a fungible and non-fungible token is provided to support the trade of network service contracts. The fungible token is a semi-private cryptocurrency that is used among network capacity producers and consumers, and other parties. The non-fungible token is a securitized digital asset derived from physical and virtual network capacity and network service contracts that are traded on the decentralized exchange governed by members of the blockchain network using the automated governance contracts that are part of the virtual machine 50.

JSON

In an embodiment, the present disclosure includes extending the distributed ledger data structure for JSON-based hierarchical, relational, and graph-based data types. That is, the virtual machines 50 can be configured to include such data types in the Blockchain.

Consensus Algorithm

In an embodiment, the consensus algorithm is programmed to Istanbul BFT and/or reliable and fault-tolerant Paxos family for transaction validation. The consensus stakeholders and end-users are organized into proposer validator relationships. The transaction cryptography can use a symmetric key and zero-knowledge proof extensions to all data types.

Blockchain Interoperability

Of note, the network 100 includes multiple layers and different protocols. In an embodiment, the present disclosure consensus algorithm messaging between peers can use different layers of OSI network model. Peers are blockchain virtual machines 50 operating on network elements. The different layers include Layer 0, Layer 1, Layer 2, etc.

Figure 10:
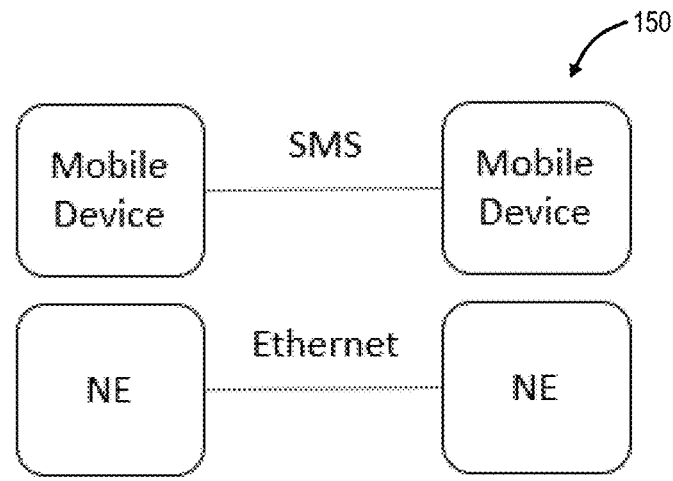
FIG. 10 is a block diagram of network elements communicating to one another at associated layers and with associated protocols.

FIG. 10 is a block diagram of network elements 150 communicating to one another at associated layers and with associated protocols. For example, the network elements 150 can include two mobile devices that communicate via Short Messaging Service (SMS), i.e., text. In another example, the network elements 150 can be switches that communicate to one another via Ethernet. Of course, the mobile device can also be configured to communicate with the switch.

Figure 11:
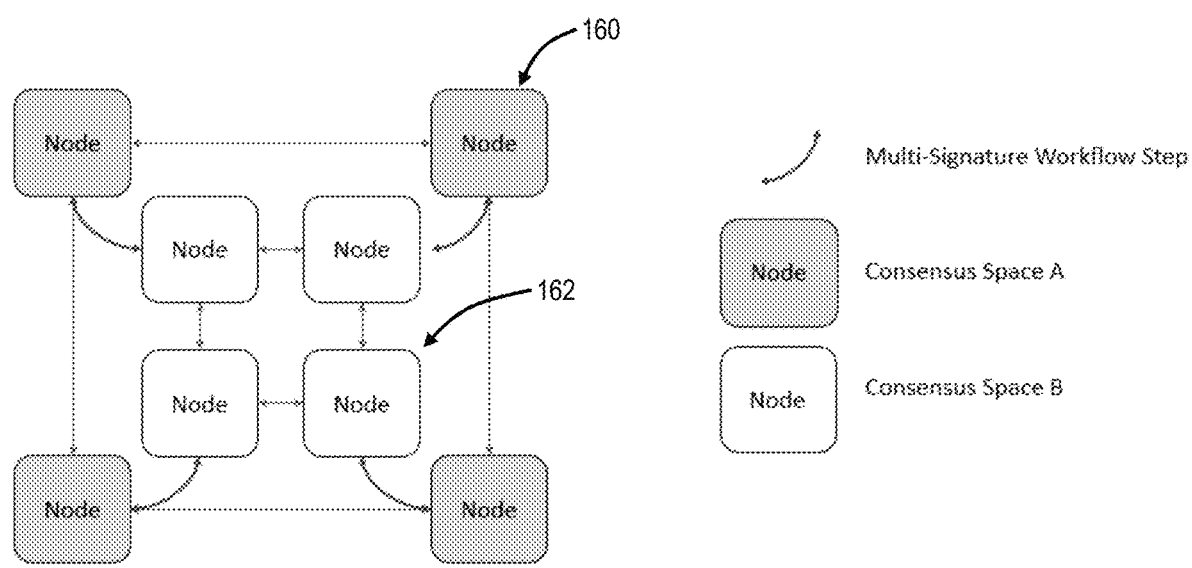
FIG. 11 is a network diagram of network elements interoperating with two different consensus spaces A, B.

FIG. 11 is a network diagram of network elements 160, 162 interoperating with two different consensus spaces A, B. For example, the network elements 160 may be mobile devices, and the network elements 162 may be switches. Other examples are also contemplated.

The present disclosure includes interoperability between two or more Blockchains each with its own consensus algorithm space. These are steps to coordinate transactions between them. For example, consensus space A finalizes transactions using proof of work consensus algorithm, and consensus space B finalizes transactions using Raft or Istanbul consensus. Each space A, B has its own distinct Blockchain.

For example, a multi-signature workflow smart contract is deployed to each space A, B. Space B submits a transaction to transfer a token to space A. Each node in space B approves the transfer by providing their encryption key. Once all nodes in space B sign the transaction, they each submit a transaction to the contract in space A. Once all nodes in space A complete the transaction, the transfer is recorded in space A.

Space A and B are two different Blockchains. If a transaction goes through space A then record the transaction on space B reliably. One chain could be running proof of work. The other could be running proof of stake. Messaging between virtual machines 50 can be encrypted and can be delivered through different network layers.

The operation of the virtual machine 50 and process require validators, end users, provers, verifiers, producers, and consumers to form a peer-to-peer Blockchain network. There can be fault tolerance up to 51% nodes in failure.

Network Applications

Network capacity provider A submits a transaction describing network capacity asset and service contract attributes. Provider B submits the same. Organization C wants to build a circuit from a network associated with provider A to a network associated with provider B and submits a contract. Providers A and B bid and approve the contract and it is submitted to each organization for turnup. Tokens are transferred between A and B and C throughout the lifecycle of the contract. The capacity and service inventory from each organization is written to the Blockchain.

A page rank algorithm can increase the demand factor of a specific inventory when requests are made to quote prices for including the inventory in the service contract. The supply and demand are matched through a search algorithm that matches attributes between orders and capacity.

In another embodiment, a Blockchain network can be built and operated among the peers of a submarine cable consortium. The organization submits transactions as capacity becomes contracted or is released back into the pool when a service contract ends. The real-time distributed state machine updates link state and enables routing algorithm to run off the Blockchain. The virtual machine 50 is integrated with the drivers and circuitry in the network element that indicate when capacity is administratively turned on and off. Real-time performance statistics can be aggregated and written to the network service contract as an attribute to the payment and settlement process.

When organization A record accounts receivable for network capacity, it can be securitized and adjacent actors in the value chain can purchase the receivable in exchange to providing cash flow to the organization A. As network effect increases the trading marketplace can be used to speculate with derivatives in specific network capacity projects. These derivative, payment, and service contracts are implemented as decentralized smart contracts that disintermediate and removes the need for trusted third parties like banks, internet exchanges, and governance groups and others.

Applications

The present disclosure contemplates various uses of a Blockchain with the virtual machines 50. These can include, without limitation, real-time payments (e.g., exchange fee and tax regulatory avoidance), custom cryptocurrency and tokenization of network assets, network signaling and routing (e.g., manage setup and turn down, routing tables, link state, etc.), resource reservation (e.g., spectrum, capacity, end-to-end (e2e) network slices), cross border transactions (e.g., inter-carrier, datacenter, organization, etc.), real-time event monitoring (e.g., faults, workflow steps, etc.), inventory record keeping (e.g., inventory management, network element, ports, etc.), lifecycle automation (e.g., contracts), multi-signature workflows and processes (e.g., Service Layer Agreement (SLA) management, legal workflow, etc.), consortiums and private peers (e.g., submarine, financial networks, etc.), digital asset marketplace (e.g., capacity exchanges, supply and demand management, etc.), encrypted messaging (e.g., control channel, private communications, etc.), licenses and rights to use (e.g., encrypted keys), supply chains (e.g., trade finance enablement for producer consumer chain), protection against censorship (e.g., immutable data structure, not centralized), decentralized counterparty (e.g., clearing and settlement), governance (e.g., private financial infrastructure, Over-the-Counter (OTC) bilateral traded derivatives), voting (e.g., county, state, regional chains), and the like.

Example Server Architecture

Figure 12:
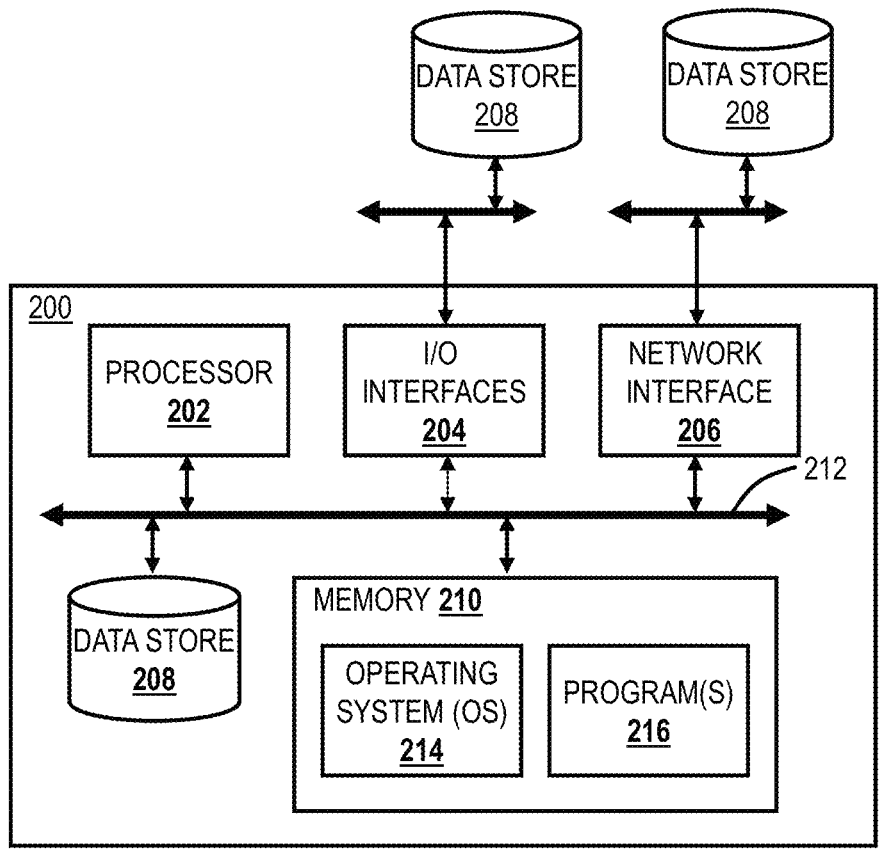
FIG. 12 is a block diagram of a server, which may be used to implement the Blockchain virtual machine.

FIG. 12 is a block diagram of a server 200, which may be used to implement the Blockchain virtual machine 50. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 12 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

Figure 13:
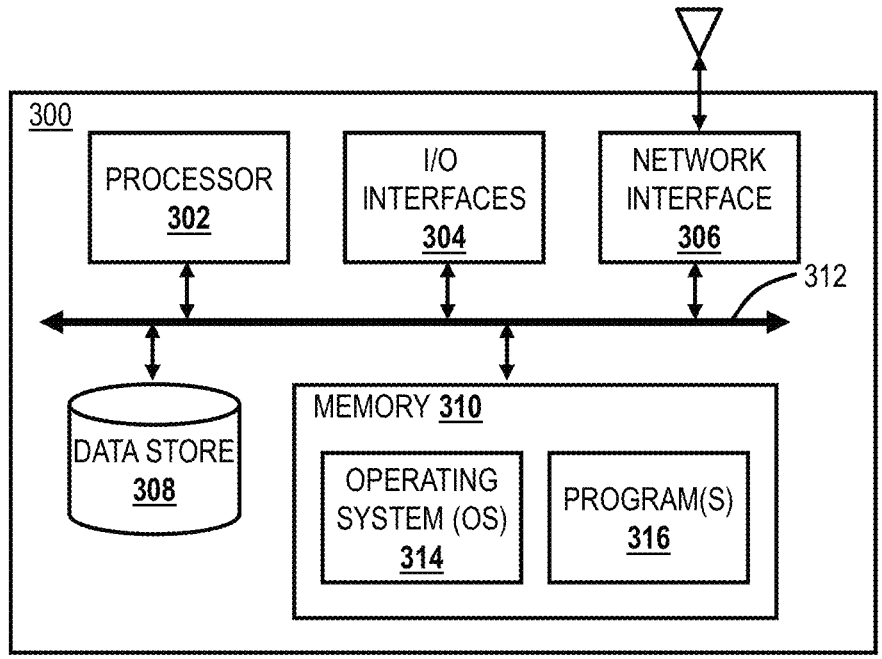
FIG. 13 is a block diagram of a user device.

FIG. 13 is a block diagram of a user device 300. This may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 13 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 13, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like.

Process

Figure 14:
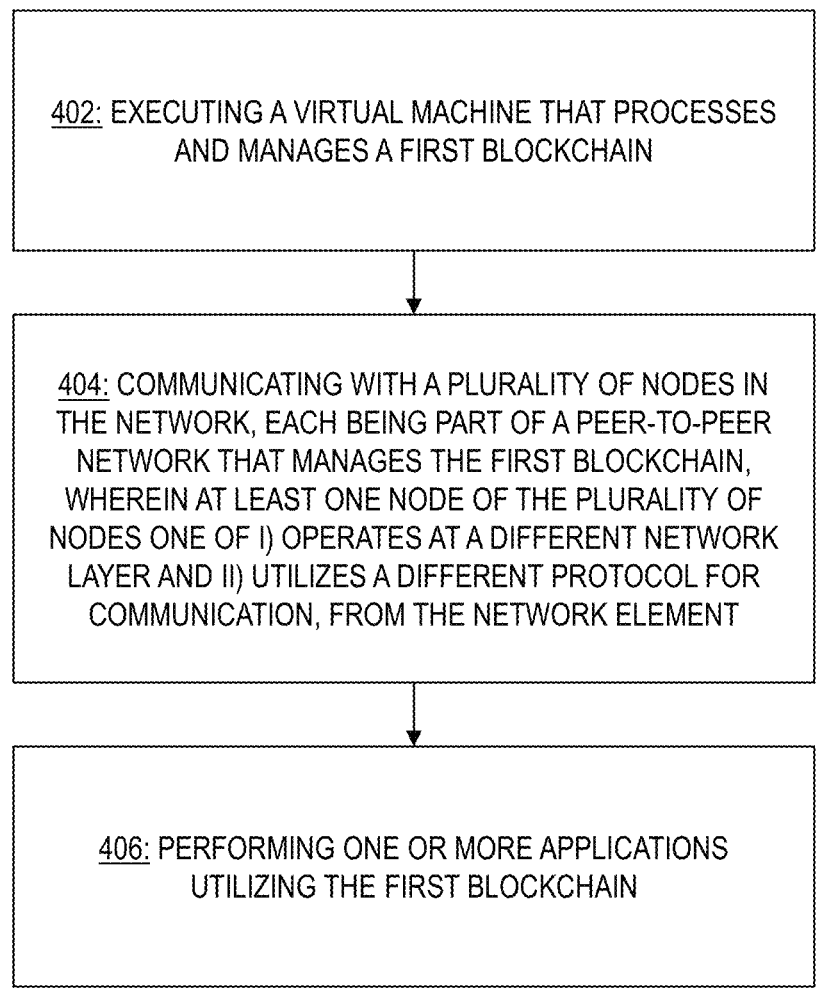
FIG. 14 is a flowchart of a blockchain process.

FIG. 14 is a flowchart of a blockchain process 400. The blockchain process 400 can be a method including steps, implemented via a processing device such as the server 200 or the user device 300, and as instructions stored in non-transitory computer-readable medium.

The blockchain process 400 includes executing a virtual machine that processes and manages a first Blockchain (step 402); communicating with a plurality of nodes in the network, each being part of a peer-to-peer network that manages the first Blockchain, wherein at least one node of the plurality of nodes one of i) operates at a different network layer and ii) utilizes a different protocol for communication, from the network element (step 404); and performing one or more applications utilizing the first Blockchain (step 406).

The at least one node can utilize the one of the different network layer and the different protocol for implementing a consensus algorithm. The blockchain process 400 can further include receiving a transaction associated with a second Blockchain; and processing the transaction with a first consensus algorithm associated with the first Blockchain. The second Blockchain can utilize a second consensus algorithm that is different from the first consensus algorithm. The second Blockchain can be from a second peer-to-peer network that is at the different network layer from the peer-to-peer network. The blockchain process 400 can further include utilizing JavaScript Object Notation (JSON) to record data in the first Blockchain. The communicating can include encryption. The one or more applications can include network capacity tokenization and cryptocurrency for network service contracts, a decentralized marketplace for trading network service contracts, and the like.

Protocol

Figure 15:
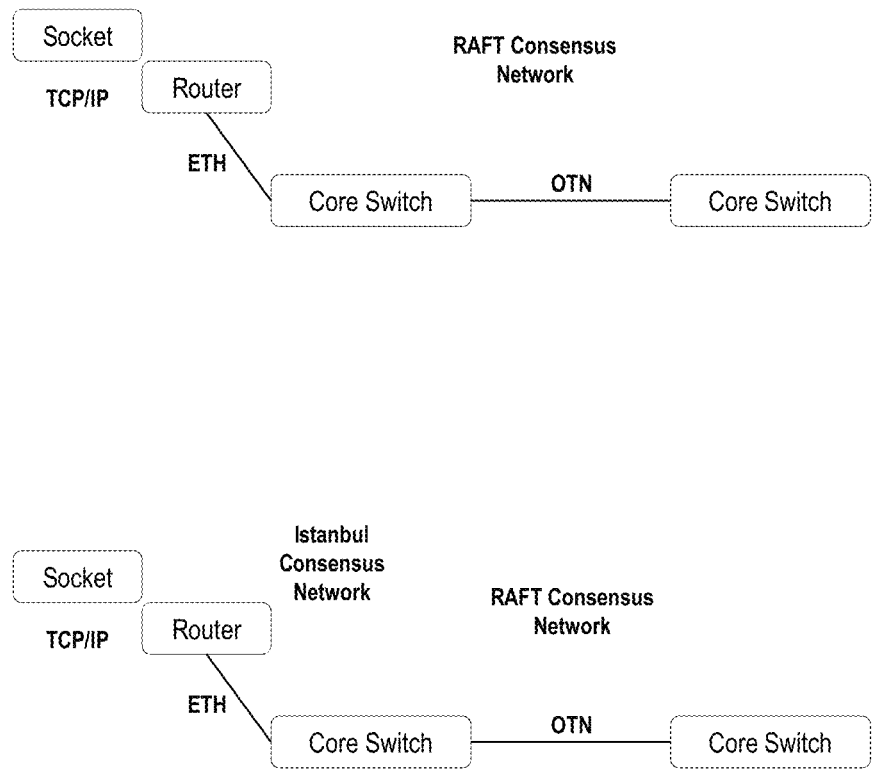
FIG. 15 is a diagram of network elements and associated functionality of a protocol used to frame JSON block information.

FIG. 15 is a diagram of network elements and associated functionality of a protocol used to frame JSON block information. FIG. 15 shows the protocol used to frame the JSON block information in the data sections of the frame and header format of that protocol. The core switch network element is part of two different consensus networks: Istanbul and RAFT. Socket edge and Router nodes are only part of the Istanbul network. Any two consensus algorithms could be used. Processors and a bus connect the networks that coordinate the transactions between them.

CONCLUSION

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, one or more processors, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium having instructions stored thereon for programming one or more processors associated with a network element in a network to perform the steps of:
   executing a first virtual machine that processes and manages a first Blockchain with a first consensus algorithm;
   communicating with a plurality of nodes in the network, each being part of a peer-to-peer network that manages that first Blockchain, wherein at least one node of the plurality of nodes one of i) operates at a different network layer, where each network layer is any of Layer 0, Layer 1, Layer 2, and Layer 3 of the Open Systems Interconnection (OSI) model, and ii) utilizes a different protocol for communication from the network element;
   performing one or more applications utilizing the first Blockchain; and
   coordinating transactions of the one or more applications between the first Blockchain and a second Blockchain processed and managed by a second virtual machine associated with a different network element, wherein the second Blockchain includes a second consensus algorithm that is different from the first consensus algorithm, and the coordinating is via a decentralized smart contract between a space associated with the first consensus algorithm and a space associated with the second consensus algorithm,
   wherein the second Blockchain is from a second peer-to-peer network that is at a different OSI network layer from the peer-to-peer network.

2. The non-transitory computer-readable medium of claim 1, wherein the at least one node utilizes the one of the different network layer and the different protocol for implementing a consensus algorithm.

3. The non-transitory computer-readable medium of claim 1, wherein the steps further include
   utilizing JavaScript Object Notation (JSON) to record data in the first Blockchain.

4. The non-transitory computer-readable medium of claim 1, wherein the communicating includes encryption.

5. The non-transitory computer-readable medium of claim 1, wherein the one or more applications include network capacity tokenization.

6. A network element comprising:
   one or more processors and memory comprising instructions that, when executed, cause the one or more processors to
   execute a first virtual machine that processes and manages a first Blockchain with a first consensus algorithm;
   communicate with a plurality of nodes in the network, each being part of a peer-to-peer network that manages the first Blockchain, wherein at least one node of the plurality of nodes one of i) operates at a different network layer where each network layer is any of Layer 0, Layer 1, Layer 2, and Layer 3 of the Open Systems Interconnection (OSI) model, and ii) utilizes a different protocol for communication from the network element,
   perform one or more applications utilizing the first Blockchain; and
   coordinate transactions of the one or more applications between the first Blockchain and a second Blockchain processed and managed by a second virtual machine associated with a different network element, wherein the second Blockchain includes a second consensus algorithm that is different from the first consensus algorithm, and the coordinating is via a decentralized smart contract between a space associated with the first consensus algorithm and a space associated with the second consensus algorithm, wherein the second Blockchain is from a second peer-to-peer network that is at a different OSI network layer from the peer-to-peer network.

7. The network element of claim 6, wherein the at least one node utilizes the one of the different network layer and the different protocol for implementing a consensus algorithm.

8. The network element of claim 6, wherein the instructions that, when executed, further cause the one or more processors to utilizing JavaScript Object Notation (JSON) to record data in the first Blockchain.

9. A method implemented by a network element comprising:

executing a first virtual machine that processes and manages a first Blockchain with a first consensus algorithm;

communicating with a plurality of nodes in the network, each being part of a peer-to-peer network that manages the first Blockchain, wherein at least one node of the plurality of nodes one of i) operates at a different network layer where each network layer is any of Layer 0, Layer 1, Layer 2, and Layer 3 of the Open Systems Interconnection (OSI) model, and ii) utilizes a different protocol for communication from the network element;

performing one or more applications utilizing the first Blockchain; and coordinating transactions of the one or more applications between the first Blockchain and a second Blockchain processed and managed by a second virtual machine associated with a different network element, wherein the second Blockchain includes a second consensus algorithm that is different from the first consensus algorithm, and the coordinating is via a decentralized smart contract between a space associated with the first consensus algorithm and a space associated with the second consensus algorithm, wherein the second Blockchain is from a second peer-to-peer network that is at a different OSI network layer from the peer-to-peer network.

10. The method of claim 9, wherein the at least one node utilizes the one of the different network layer and the different protocol for implementing a consensus algorithm.

11. The method of claim 9, further comprising utilizing JavaScript Object Notation (JSON) to record data in the first Blockchain.

* * * * *